United States Patent [19]

Leming et al.

[11] Patent Number: 4,641,431

[45] Date of Patent: Feb. 10, 1987

[54] HEDGE TRIMMER

[76] Inventors: Anthony D. Leming, 414 W. Muskogee, Sulphur, Okla. 73086; Luther C. Dawson, Rte. 1, Box 215H, Davis, Okla. 73030

[21] Appl. No.: 798,838

[22] Filed: Nov. 18, 1985

[51] Int. Cl.⁴ .............................................. B26B 27/00
[52] U.S. Cl. .................................. 30/276; 30/296 R; 56/12.7
[58] Field of Search ..................... 30/276, 296 R, 263, 30/264, 286; 56/233, 237, 12.7; 16/115, 110.5

[56] References Cited

U.S. PATENT DOCUMENTS

| | | | |
|---|---|---|---|
| 3,657,813 | 4/1972 | Knight | 30/296 R X |
| 3,831,278 | 4/1974 | Voglesonger | 30/276 |
| 4,049,059 | 9/1977 | Weibling | 30/276 X |
| 4,463,498 | 8/1984 | Everts | 30/296 R |

FOREIGN PATENT DOCUMENTS

| | | | |
|---|---|---|---|
| 1062053 | 6/1958 | Fed. Rep. of Germany | 56/233 |
| 2735617 | 2/1979 | Fed. Rep. of Germany | 30/296 R |

Primary Examiner—Douglas D. Watts
Attorney, Agent, or Firm—R. B. Coleman

[57] ABSTRACT

A new electric hedge trimmer utilizes an innovative metal wire whip, rotating at high speed inside a dish-shaped whip and chip guard, to cut hedge, bushes, vine and other relatively large-stemmed foliage effectively, safely and conveniently, as described above and as facilitated by a system of switches and handles. The wire whip can be constructed from any one of several metals, alloys or space-age composite wires to enhance performance and durability. However, scrap copper wire has been used to cut hedge five times faster and better than existing methods such as plastic monofilament or heavy metal blade cutters. For optimum performance, the wire whip is rotated at speeds in the order of 10,000 to 20,000 RPM which are easily attainable by modern motors. A close-coupled loop handle, a self-storing extension handle and a substitute extension handle provide for use of the device on low, medium or high growing foliage.

13 Claims, 3 Drawing Figures

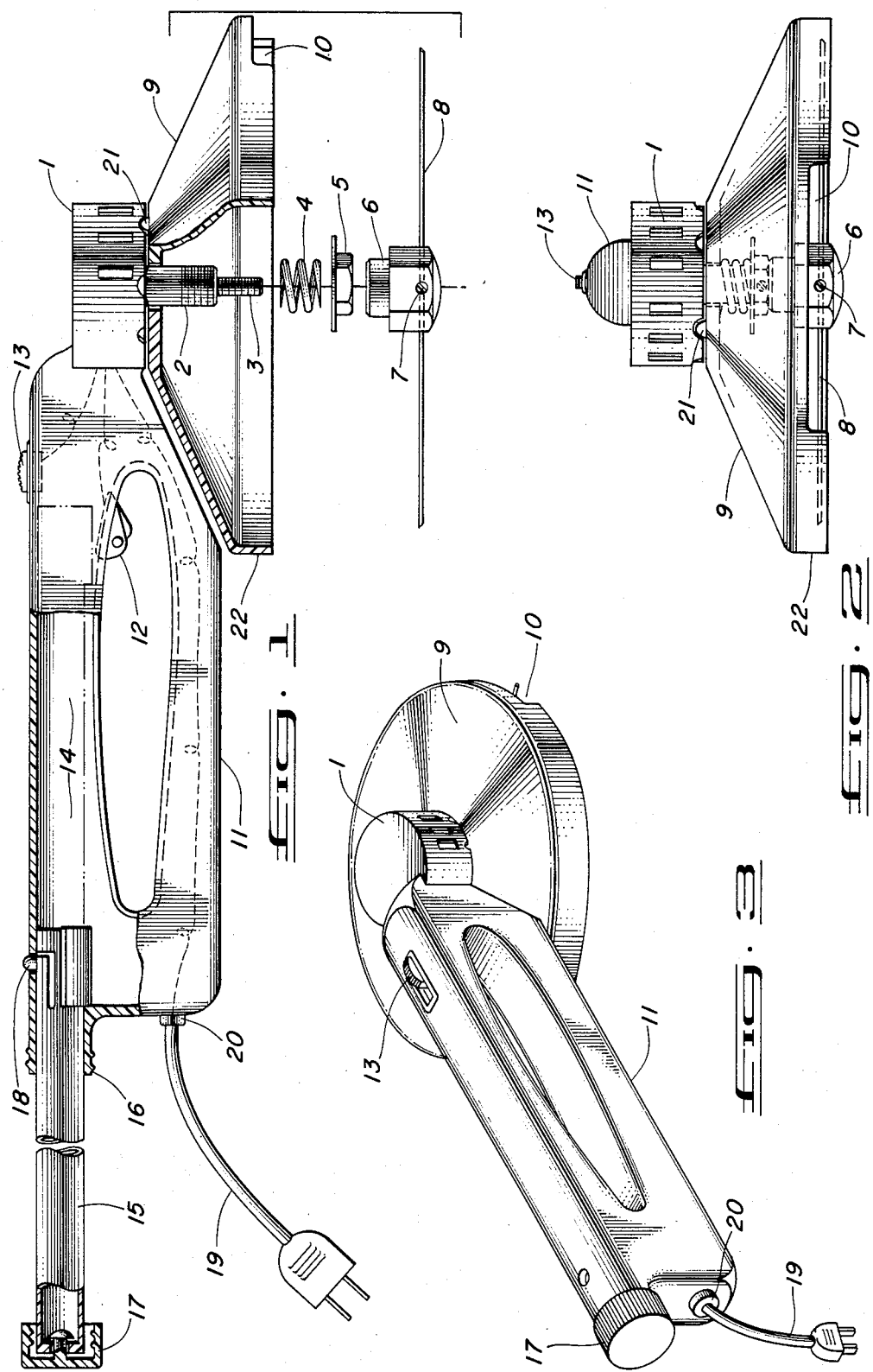

HEDGE TRIMMER

BACKGROUND AND SUMMARY OF THE INVENTION

1. Field of the Invention

This invention relates to an improved device for trimming hedge, bushes and other ornamental plants and shrubs used in landscape gardening. Nearly everyone is familiar with and rejoices in the use and/or the results achieved with rotating monofilament lawn edgers and trimmers such as the WEEDEATER ® for cutting grasses and small weed plants along or near curbs, driveways, walks, foundations, tree trunks, etc. Such devices are effective and safe for this purpose. They are not entirely satisfactory for cutting the tougher, thicker stems of the larger plants. Better means for accomplishing this purpose is the object of this invention.

2. The Prior Art

Other approaches have been used for this latter purpose. Thus, U.S. Pat. No. 3,050,854 issued Aug. 28, 1962 to J. Becker et al discloses a rotary hedge trimmer utilizing an electric motor to drive a relatively heavy cutting blade, which is wider at the outer ends than at the center and which has serrated edges sharpened to a knife edge to cut the hedge. While this device is effective for trimming hedge, the blade is relatively heavy and requires sharpening at frequent intervals. The motor required to drive such a heavy blade is apt to be heavy too, and relatively slow. Such a combination, while effective, could be tiring and dangerous if dropped or entangled in the limbs of a hedge or bush.

U.S. Pat. No. 3,417,420 issued Dec. 24, 1968 to L. B. Damon discloses a hedge trimmer involving a heavy blade, which operates similar to Becker in U.S. Pat. No. 3,050,854, except that Damon has two switches in series, both of which have to be held "on" with the operator's two hands in order to keep the motor running. Damon was quite concerned about the safety aspect of this and similar tools. His system of switches and a motor brake were designed to stop the motor immediately so the heavy blade would not injure the operator if the tool were dropped or were jerked out of his hand. Damon made no provision for an extension handle on his tool.

U.S. Pat. No. 3,693,255 issued Sept. 26, 1972 to J. Langenstein discloses a lawn edge trimmer utilizing a motor with a shaft and a hub or spool from which extends the end of a synthetic resin (plastic) wire, which is spun about the motor axis and acts as a cutting element. The handle on this device is detachable so the basic motor unit can be used for other purposes such as hedge trimming. Such a device would be relatively light and safe for such use, but the single synthetic resin wire envisioned has the disadvantages of cutting heavy hedge slowly and needing replacement at frequent intervals.

U.S. Pat. No. 4,062,115 issued Dec. 13, 1977 to W. R. Lee discloses a rotary garden cutter utilizing a multiplicity of flexible plastic lines attached to the periphery of a rapidly rotating hub. New lines can be installed quickly and easily as old lines become worn or break off. Lee points out that these flexible lines have a relatively short life and he discusses some of the approaches that have been tried to solve this problem. His preferred material for these lines is nylon monofilament of about 0.1 inches in diameter for rotation speeds of about 3600 revolutions per minute (RPM). The cutter can be used on the end of a long power wand or in a hand drill.

U.S. Pat. No. 4,202,094 issued May 13, 1980 to Kalmar discloses another single filament grass cutting attachment for mounting on a hand drill which includes a spool of plastic filament in the center of a hub to facilitate replacement of the filament as it wears. Kalmar recognizes flail-type mowers with which grass is cut by means of a flail or flexible length of material which may be a length of wire, cord, or even linked rigid members as in a chain. However, Kalmar concludes that this type of lawn mower is generally as expensive as a conventional lawn mower, because the difference between the cost of cutting blades and flails are negligible in comparison to the cost of the motors and chassis required for either of these options. Her objectives were similar to Langenstein's in that she wanted to (1) save money as compared to buying an expensive lawn mower, and (2) find another use for the familiar hand drill.

Thus, Applicant's device is an improvement over these methods in that a metal wire whip is rotated at a very high speed (i.e. ~17,000 RPM) and used to cut hedge effectively, while a choice of handles provides convenience for use on low, high and intermediate-sized hedge and/or bushes. The wire whip does not flail; it cuts like plastic filament except that it is stronger and tougher than plastic, so it lasts much longer in use. It can cut the heavier stems of hedge and brush quicker and better than plastic filaments or strings.

The Applicant's wire cutter blade is also softer and more flexible than the heavy rigid blades of Becker and Damon. Therefore, it is intrinsically safer for the operator and, in addition, a system of parallel switches, an adjustable whip and chip guard, and two interchangeable handles provide additional safety and convenience.

The wire whip for cutting relatively coarse-stemmed foliage can be easily replaced when damaged or worn by simply sticking a new wire through a hole and tightening a set screw. Suitable wires can be made of various metals, alloys and/or space age composite materials to optimize performance. We have found that a small scrap of 12 to 14 gage copper bus wire, or some such material, will cut hedge about five times faster than a filament or blade cutter and the job is done safely, smoothly, quickly, quietly and easily. Obviously, any of these three devices is a great improvement over the old fashioned manual scissors-type cutters, and much quieter and safer than the reciprocating, saw-tooth type of power tools.

BRIEF DESCRIPTION OF THE DRAWINGS

FIG. 1 shows the hedge trimmer in side view with sectional view of key features and an exploded view of parts attached to the shaft of the motor.

FIG. 2 is an end view of the hedge trimmer showing the opening in the lip of the whip and chip guard, the whip, the motor housing, the front end of the handle and the "on/off" switch used with the long extension handle.

FIG. 3 is an oblique view of the hedge trimmer, looking down on the upper surface of the device from the right rear quarter. The cap retaining the short extension handle inside the loop handle, the switch on top of the loop handle (in the "on" position) and the power cord may be seen.

DETAILED DESCRIPTION OF THE DRAWINGS

A key element of the hedge trimmer is the electric motor used to drive the wire whip on the hedge cutter. FIG. 1 shows the electric motor inside its housing or covering (1), with the drive shaft (3) of the motor extending downwardly through the bottom of the housing (1) and a hollow cylindrical tube (2) attached to the lower end of the housing. The hollow tube (2) is threaded on its lower end so as to act with the spring (4) and nut (5) to retain the dish-shaped whip and chip guard (9) against the lower side of the housing. Thus the guard (9) is not rigidly attached to the lower part of the housing, but is snugly held against the housing by the spring. The chip guard comprises a lip (22) having an opening or slot (10) therein. The lip is preferably ¾″ to 1″ in depth. The guard can be rotated about the axis of itself and the motor as desired by compressing the spring and twisting the guard to position the slot (10) in its lower edge in any desired direction with respect to the handle (11) of the device. Detents (21) on the upper surface of the guard and on the lower surface of the motor housing restrain the guard in any position selected by the operator.

Another key element on the hedge trimmer is the wire whip (8) which is the device that actually cuts the hedge stems or other foliage. In the preferred embodiment of our invention, the wire whip (8) actually *is* a metal wire or cable about twelve inches long which is threaded through the metal plug (6) and fixed at its midpoint by adjusting the set screw (7) into the side of the plug. The metal plug (6) screws onto the shaft (3) of the motor with left hand threads so as to securely attach the metal plug and the wire whip to the drive shaft (3) of the motor. The wire whip rotates at speeds between 10,000 to 20,000 RPM, preferably between 12,500 to 16,500 RPM when in use.

A hollow, elongated, loop-shaped handle (11) is attached to the motor housing (1) for convenience in using and controlling the hedge trimmer. Two switches are located in the upper member of the loop-shaped handle to control the motor. Switch (12) is a safety switch designed to protect the operator while the hedge cutter is being held by the top loop handle. A detent must be released before this switch (12) can be activated to start the motor. Finger pressure must be maintained to keep the motor running. Switch (13) is wired in parallel with switch (12) to provide "on" and "off" control of the motor while the device is being used as a "wand" with the long extension handle.

The upper member of the elongated, loop-shaped handle shown in FIG. 1 provides space for storing and/or attaching an extension handle. Two kinds of extension handles are envisioned; one "built in" handle (15) is relatively short, but it provides some additional convenience, variety and utility over the loop handle when needed. When *not* in use, this handle may be securely fastened into the hollow loop handle with the screw cap (17). The lock button (18) acts through a hole in the top surface of the loop handle near the handle opening to fix the extension handles in their extended positions. For exceptionally high hedges or bushes, we envision that the short extension handle will be removed and a handle perhaps two to four feet long will replace it. This handle could telescope out to any desired length by means of additional lock buttons (18) on the long handle as is well known in the art.

A power lead is attached to the lower member of the hollow loop handle at the fixture (20) and wires are led through the lower member, forward to the switches (12) and (13) and to the motor in the housing (1).

Various materials can be used for the wire whip (8). Something stronger and tougher than the monofilament plastic wires used on conventional WEEDEATER ® lawn edgers is necessary. While solid wire whips, such as one of the copper conductors stripped from Romex wire commonly used to wire houses has proved effective, other wires as iron, steel, stainless steel, nichrome, hastiloy, aluminum, tin, zinc, nickel, cadmium, magnesium, lead, titanium, cobalt manganese, chromium, molybdenum, vanadium, tungsten, brass, bronze, gold, silver, or combinations of these are likely to be better, since copper tends to become brittle and break when flexed in use. Double wrapped metal cables, twisted metal ropes, or metal braids may be better than solid wire.

This tool can be conveniently and economically constructed of high impact strength plastic or light metal such as aluminum, so that it is quick and easy to use. A prototype has cut hedge about five times faster than alternative devices.

Changes and modifications in the specifically described embodiments as described above can be carried out without departing from the scope of the invention, which is intended to be limited only by the scope of the appended claims.

We claim:

1. A hedge trimmer comprising in combination
   (a) a circular cutter guard having a lip projecting from the lower edge of said guard and extending around a major segment of the periphery of said guard with an opening extending along a minor segment of said periphery,
   (b) a rotatable shaft extending through the center of said guard and opposite said lip,
   (c) means for rotating said shaft at high revolutions per minute attached to said shaft above said guard, and further comprising
   (d) means for providing selective positioning of said guard and said opening in said lip about said shaft as desired prior to use,
   (e) a wire whip attached to said rotatable shaft within said lip and extending radially from said shaft toward said lip, and
   (f) a handle and control means mounted above said guard on said rotating means, whereby the wire whip can be caused to rotate rapidly and cut hedge effectively.

2. A hedge trimmer comprising
   (a) an electric motor with a single drive shaft, the motor being mounted in
   (b) a housing with a small hole in the bottom for the drive shaft of the motor and other holes in the sides and top for ventilation,
   (c) a hollow handle comprising an extension handle, switches and a power cord attached to the motor housing,
   (d) a circular, dish-shaped whip and chip guard attached to the bottom end of the motor housing below the handle and above the shaft, said guard having a flat top with a small hole in its center for the drive shaft, a tapered body with a lip turned downwardly along part of its periphery,
   (e) a wire whip cutter attached to the drive shaft so as to spin in the lip of the guard, (f) a slot on one side of the guard to allow the whip to contact the hedge, said slot being adjustable about the axis of the guard, whereby the wire whip can be rapidly rotated and used to trim a hedge or bush.

3. A hedge trimmer comprising
(a) an electric motor in a housing for rapidly rotating
(b) a wire whip cutting element attached to
(c) a drive shaft on said motor,
(d) an attachment means mounted on the motor housing concentric with the drive shaft for holding
(e) a dish-shaped whip and chip guard to protect the operator, said guard adapted on its lower edge with a lip and an opening
(f) or slot therein to expose the whip to the hedge,
(g) a whip holder means, comprising a metal plug with drill holes and set screws, for attaching and holding the wire whip on the shaft of the motor at the lip of the guard,
(h) a hollow double-element handle attached to the side of the motor housing to provide hand grips and accomodations for
(i) switch means for controlling the motor,
(j) an opening and space at the back end of the top member of the handle for attaching and/or storing
(k) an extension handle for reaching high bushes,
(l) means for retaining a short extension handle in the storage space,
(m) other means for attaching and holding extension handles in the extended position, and
(n) means for admitting and retaining a power lead at the back end of the bottom member of the hollow handle.

4. A hedge trimmer as in claim 3 wherein the wire whip is made of metal or a metal alloy and, as installed, is 6" to 18" long and 1/16" to 3/16" in diameter.

5. A hedge trimmer as in claim 3 wherein said whip and chip guard can be rotated on support means to place the opening or slot in the lip into any position such as at the front, either side, or in back of the motor by means of spring loaded detent notches.

6. A hedge trimmer as in claim 5 wherein the length of the opening or slot in the lip of the whip and chip guard is between 20 percent and 50 percent of the circumference of the guard.

7. A hedge trimmer as in claim 5 wherein the length of the opening or slot in the lip of the whip and chip guard is 33 percent of the circumference of the guard.

8. A hedge trimmer as in claim 6 wherein said whip holder means can accomodate one or more wire whips.

9. A hedge trimmer as in claim 6, wherein a replacement handle 2 to 10 feet long is temporarily latched into the hollow main handle to provide an extended reach.

10. A hedge trimmer as in claim 9, wherein there are actual switch means and one such switch means can be latched into "on" or "off" positions, and the other switch means is a "trigger" switch which must be unlocked to turn "on" and which turns "off" automatically when released.

11. A hedge trimmer as in claim 4 wherein said wire whip is made from one or a combination of metals selected from the group comprising iron, steel, copper, aluminum, nickel, cadmium, magnesium, molybdenum, manganese, molybdenum, vanadium, tungsten, chromium, titanium, zinc, lead, tin, silver, platinum and gold.

12. A hedge trimmer as in claim 4 wherein said wire whip is constructed as a multiplicity of fine metal wires, either woven, braided or twisted together, in the form of *a flexible wire cable.*

13. A hedge trimmer as in claim 3 wherein said wire whip is made from a "space age" material such as fiberglass reinforced plastic wire, filiament carbon, KELVAR ® and/or various other composite materials providing strength, toughness, and flexibility.

* * * * *